United States Patent Office 3,478,045
Patented Nov. 11, 1969

3,478,045
PRODUCTION OF 5-MERCAPTO-1,2,4-THIODIAZOLE DERIVATIVES
Erwin Hahn, Viernheim, Hesse, and Matthias Seefelder, Ludwigshafen (Rhine), Germany, assignors to Badische Anilin- & Soda-Fabrik Aktiengesellschaft, Ludwigshafen (Rhine), Germany
No Drawing. Filed Apr. 5, 1967, Ser. No. 628,540
Claims priority, application Germany, Apr. 9, 1966, 1,670,068
Int. Cl. C07d 91/60
U.S. Cl. 260—302           7 Claims

ABSTRACT OF THE DISCLOSURE

This invention concerns a process for the production of 5-mercapto-1,2,4-thiodiazole derivatives which contain aryl radicals in the 3-position and are valuable intermediates for example for dyes by reaction of amidines or isothiourea salt derivatives with sulfur and with carbon disulfide.

---

The present invention relates to a new process for the production of 5-mercapto-1,2,4-thiodiazole derivatives which bear aromatic radicals or alkylmercapto radicals as substituents in the 3-position.

It is known that 5-mercapto-1,2,4-thiodiazole derivatives which contain aryl radicals in the 3-position can be prepared by reaction of amidoximes with carbon disulfide and alkali. The yields in this method (Chem. Ber., 24, 388 (1891)), are unsatisfactory. The reaction requires a long time and moreover does not proceed uniformly because the reaction product is always contaminated with the corresponding 1,2,4-oxdiazole derivatives.

We have now found that thiodiazole derivatives having the general formula:

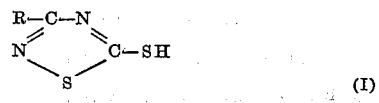

(I)

in which R denotes one of the radicals: phenyl, naphthyl, 3-methylphenyl, 4-methylphenyl, 4-nitrophenyl, 4-chlorophenyl, 4-carbomethoxyphenyl, 3-methyl-4-nitrophenyl, methylmercapto, benzylmercapto and p-chlorobenzylmercapto are advantageously obtained when an amidine or isothiourea compound having the general formula:

(II)

in which R has the above meaning, or the corresponding amidinium or thiuronium salts of compounds having the Formula II in organic solvents and in the presence of basic reacting substances at temperatures of up to 100° C. with sulfur and carbon disulfide.

Examples of aromatic amidines which may be used as starting material are the following: benzamidine, 4-methylbenzamidine, 3-methylbenzamidine, 4-nitrobenzamidine, 4-chlorobenzamidine, 4-carbonmethoxybenzamidine and 3-methyl-4-nitrobenzamidine. The following are examples of S-alkylisothiourea compounds having the Formula II: S-methylisothiourea, S-benzylisothiourea and S-(p-chlorobenzyl)-thiourea.

Examples of basic reacting substances are: alcoholates, oxides of alkali metals or alkaline earth metals or tertiary amines. Alcoholates, such as sodium methylate, sodium ethylate, sodium isopropylate and sodium tertbutylate are particularly advantageous.

All solvents inert to the reactants are suitable as organic solvents, such as tetrahydrofuran, dioxane, alcohols, such as methanol, ethanol, isopropanol, isobutanol, benzene, toluene, xylene, chlorobenzene, dichlorobenzene, carbon tetrachloride, dimethylformamide and N-methylpyrrolidone. Mixtures of these solvents may also be used.

The new process may be carried out for example by reacting the amidines or isothiourea compounds in an organic solvent, preferably in the presence of up to 2.5 equivalents (based on the amidine or isothiourea) of a basic-reacting substance of the said type, with sulfur and carbon disulfide at a temperature up to 100° C. It is advantageous to use 1 to 2 equivalents, preferably about 1 equivalent, of sulfur and 1 to 10 equivalents, preferably 2 to 6 equivalents, of carbon disulfide, each based on the amidine or isothiourea.

When the starting material is not a free amidine or isothiourea compound, but the corresponding amidinium or isothiouronium salt, such as the chloride, sulfate or toluene sulfonate, the presence of one equivalent (based on amidinium or thiouronium salt) of basic-reacting substance of the above type is essential for the reaction. It is advantageous to use about 3 equivalents of base, based on the amidinium or isothiouronium salt used. In this embodiment of the process according to this invention, it is particularly advantageous first to add to the reaction mixture the amount of basic-reacting substance required to convert the amidinium or thiouronium salt into the free amidine or thiourea, and to defer the addition of the remainder of the basic-reacting substance until after all the other reactants have been added.

5-mercapto-1,2,4-thiodiazole derivatives are obtained in good yields by the process according to this invention. This advantageous result is surprising because it is known from Liebig's Annalen, 192, 1 (1878), that amidines react with carbon disulfide to form thioamides and amidinium thiocyanates.

Some of the compounds obtainable by the process according to this invention are effective against plant pests and may be used as intermediates for pesticides, pharmaceuticals and dyes.

The invention is illustrated by the following examples. The parts and percentages given in the examples are by weight.

Example 1

31.3 parts of benzamidine hydrochloride, 108 parts of a 30% sodium methylate solution in methanol, 38 parts of carbon disulfide and 7.9 parts of powdered sulfur are boiled under reflux in 200 parts of methanol for six hours, allowed to cool, suction filtered and the filtrate evaporated. The residue is dissolved in hot water. The solution is filtered, the reaction product is precipitated by acidification with acetic acid to pH 4 and recrystallized from alcohol. 27.2 parts of 3-phenyl-5-mercapto-1,2,4-thiodiazole having a melting point of 161° to 163° C. is obtained, equivalent to 70% of the theory based on benzamidine.

Example 2

21.6 parts of sodium methylate is added while cooling in the course of half an hour to 31.3 parts of benzamidine hydrochloride, 10.8 parts of sodium methylate, 26 parts of carbon disulfide and 7 parts of sulfur in 75 parts of dimethylformamide. The reaction mixture is heated for six hours at 60° C. and then poured into four to five times its weight of water. Animal charcoal is then added, followed by filtration and acidification with acetic acid, 28 parts of 3-phenyl-5-mercapto-1,2,4-thiodiazole having a melting point of 160° to 162° C. is obtained, i.e. 72% of the theory.

Example 3

51.2 parts of 4-methylbenzamidine hydrochloride, 16.2 parts of sodium methylate, 38 parts of carbon disulfide and 10.6 parts of powdered sulfur are reacted in 250 parts of chlorobenzene while stirring and adding another 16.2 parts of sodium methylate. The reaction mixture is then heated at 70° C. for four hours. 500 parts of water is added, the whole is stirred vigorously for some time and the aqueous layer is separated off. The organic layer is shaken up with 200 parts of dilute caustic soda solution. The combined aqueous extracts are treated with animal charcoal, filtered and acidified with acetic acid. The precipitate is suction filtered and recrystallized from glacial acetic acid. 49 parts (75% of the theory) of 3-(3'-methylphenyl)-5-mercapto-1,2,4-thiodiazole having a melting point of 170° to 172° C. is obtained.

Example 4

51.2 parts of 3-methylbenzamidine hydrochloride is reacted in 250 parts of chlorobenzene as described in Example 3 with carbon disulfide, sulfur and sodium methylate. The reaction mixture is worked up. Following recrystallization from glacial acetic acid, 42 parts of 3 - (3'-methylphenyl)-5-mercapto-1,2,4-thiodiazole is obtained having a melting point of 138° to 140° C. This is equivalent to a yield of 64% of the theory.

Example 5

20.2 parts of p-nitrobenzamidine hydrochloride, 13 parts of carbon disulfide and 3.5 parts of sulfur powder are reacted in 50 parts of dimethylformamide with 18 parts of a 30% sodium methylate solution, the temperature being kept at below 40° C. by slight cooling. The whole is then stirred for two hours at 40° to 45° C., poured into water and acidified with acetic acid. 18.5 parts of 3-(p-nitrophenyl)-5-mercapto-1,2,4-thiodiazole is obtained by recrystallization. The product melts at 261° to 263° C. with decomposition. The yield is 81% of the theory based on p-nitrobenzamidine.

Example 6

16.2 parts of sodium methylate is added to 83.4 parts of S-methylisothiouronium sulfate and 75 parts of dimethylformamide. After the whole has been stirred for one hour, 39 parts of carbon disulfide, 10.6 parts of powdered sulfur and another 32.4 parts of sodium methylate are added. The mixture is heated for six hours at 60° to 65° C., then 250 parts of water is added, the whole is treated with animal charcoal, filtered, acidified with acetic acid, cooled to 0° C. and suction filtered. The product is recrystallized from glacial acetic acid. 21 parts of 3-methylmercapto-5-mercapto-1,2,4-thiodiazole (43% of the theory) is obtained. The substance melts at 158° to 159° C. with decomposition.

We claim:
1. A process for the production of a thiazole compound of the formula

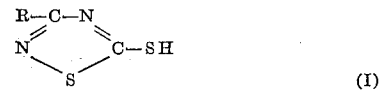

(I)

wherein R denotes a substituent selected from the class consisting of phenyl, 3-methylphenyl, 4-methylphenyl, 4-nitrophenyl and methylmercapto, which process comprises reacting an amidinium hydrochloride or a thiouronium sulfate of a compound of the formula

(II)

wherein R has the same meaning given above, as the initial reactant in an organic solvent at a temperature up to 100° C. and in the presence of at least 1 up to approximately 3 equivalents of a basic-reacting substance, with about 1 to 2 equivalents of sulfur and about 1 to 10 equivalents of carbon disulfide, each of the equivalents being based on the amidinium hydrochloride or the thiouronium sulfate.

2. A process as claimed in claim 1 wherein said basic-reacting substance is an alcoholate selected from the class consisting of sodium methylate, sodium ethylate, sodium isopropylate and sodium tert-butylate.

3. A process as claimed in claim 2 wherein the initial reactant is benzamidine hydrochloride.

4. A process as claimed in claim 2 wherein the initial reactant is 4-methylbenzamidine hydrochloride.

5. A process as claimed in claim 2 wherein the initial reactant is 3-methylbenzamidine hydrochloride.

6. A process as claimed in claim 2 wherein the initial reactant is 4-nitrobenzamidine hydrocloride.

7. A process as claimed in claim 2 wherein the initial reactant is S-methylisothiouronium sulfate.

References Cited

UNITED STATES PATENTS 3,159,644  12/1964  Stephens _____ 260—302

ALEX MAZEL, Primary Examiner

R. J. GALLAGHER, Assistant Examiner

U.S. Cl. X.R.

260—306.7, 999